(12) United States Patent
Chan et al.

(10) Patent No.: US 7,854,550 B2
(45) Date of Patent: Dec. 21, 2010

(54) INTELLIGENT ILLUMINATION THERMOMETER

(75) Inventors: Chung Man Chan, Hong Kong (HK); Ching Ching Cheung, Hong Kong (HK); Ka Lun Fan, Hong Kong (HK); Hung Keung Tse, Hong Kong (HK)

(73) Assignee: Aviton Care Limited, Kwun Tong, Kowloon (HK)

( * ) Notice: Subject to any disclaimer, the term of this patent is extended or adjusted under 35 U.S.C. 154(b) by 292 days.

(21) Appl. No.: 11/969,237

(22) Filed: Jan. 4, 2008

(65) Prior Publication Data

US 2009/0175317 A1    Jul. 9, 2009

(51) Int. Cl.
*G01K 1/00* (2006.01)
*G01K 7/00* (2006.01)

(52) U.S. Cl. .................... 374/208; 374/163; 600/549
(58) Field of Classification Search .............. 374/170, 374/208, 163; 600/549
See application file for complete search history.

(56) References Cited

U.S. PATENT DOCUMENTS

| | | | | |
|---|---|---|---|---|
| 4,790,324 A | * | 12/1988 | O'Hara et al. | 600/474 |
| 5,181,521 A | * | 1/1993 | Lemelson | 600/549 |
| 5,829,878 A | * | 11/1998 | Weiss et al. | 374/163 |
| 2003/0202558 A1 | * | 10/2003 | Chung et al. | 374/155 |
| 2006/0181410 A1 | * | 8/2006 | Staples | 340/539.1 |
| 2006/0291535 A1 | * | 12/2006 | Craig et al. | 374/208 |
| 2007/0014328 A1 | * | 1/2007 | Weng et al. | 374/121 |
| 2008/0151965 A1 | * | 6/2008 | Kim | 374/162 |
| 2009/0172591 A1 | * | 7/2009 | Pomper | 715/810 |
| 2009/0179894 A1 | * | 7/2009 | Bakalash et al. | 345/422 |
| 2009/0257469 A1 | * | 10/2009 | Jones et al. | 374/133 |
| 2009/0278789 A1 | * | 11/2009 | Declercq et al. | 345/102 |

\* cited by examiner

*Primary Examiner*—Lisa M Caputo
*Assistant Examiner*—Mirellys Jagan
(74) *Attorney, Agent, or Firm*—Egbert Law Offices PLLC

(57) ABSTRACT

A thermometer includes an illuminated display, which may act as an intelligent indicator of the change and level of temperature. The thermometer includes memory unit accommodating multiple users and their past records respectively. When a new temperature reading is obtained, the thermometer compares the new temperature against the immediate preceding record of the same user. The thermometer further includes a display module indicating the change of temperature reading and the fever status of the user.

8 Claims, 8 Drawing Sheets

Fig. 1
Fig. 3b
Fig. 2
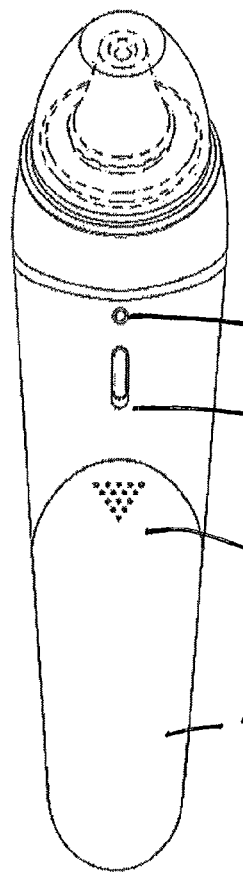
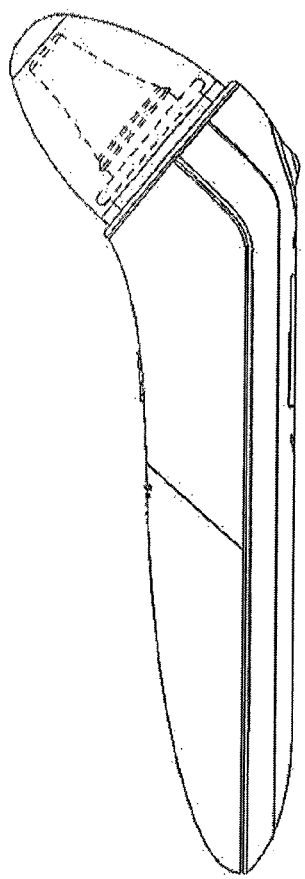
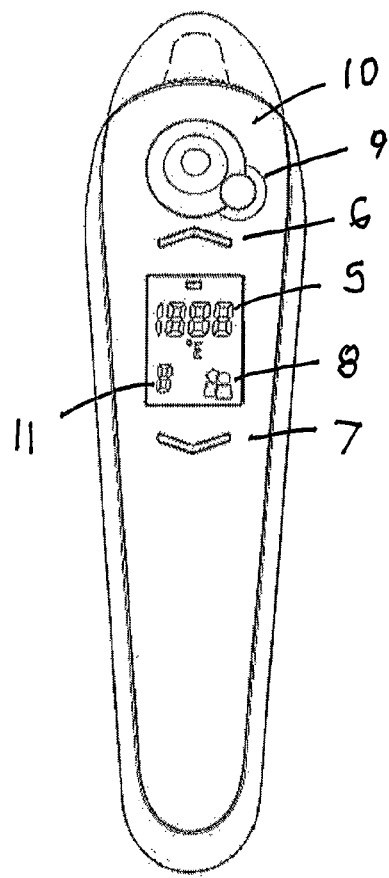
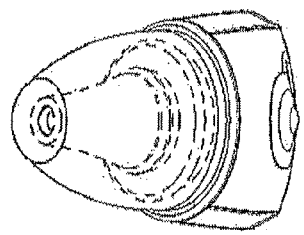
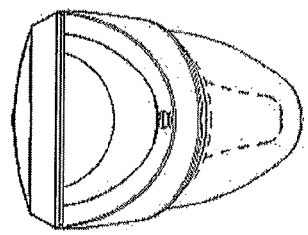
Fig. 3a
Fig. 3c

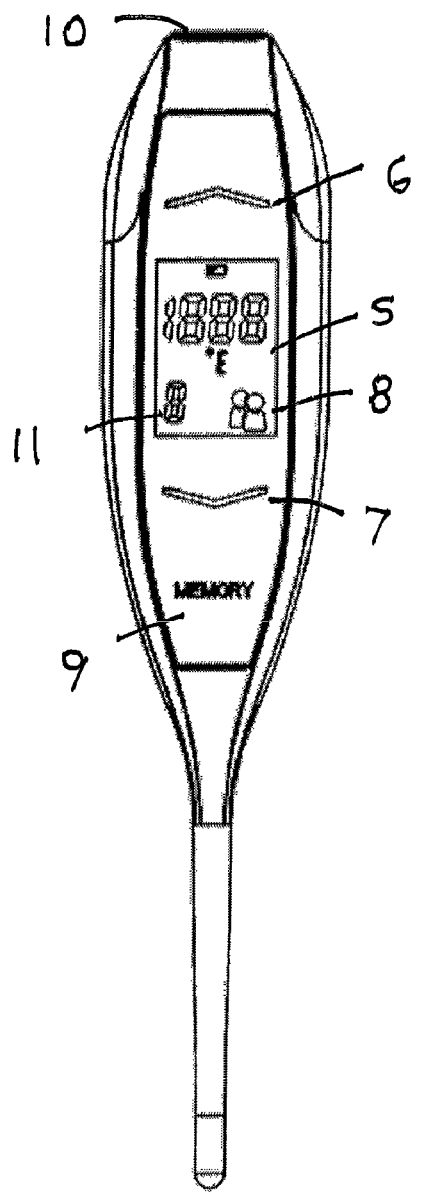
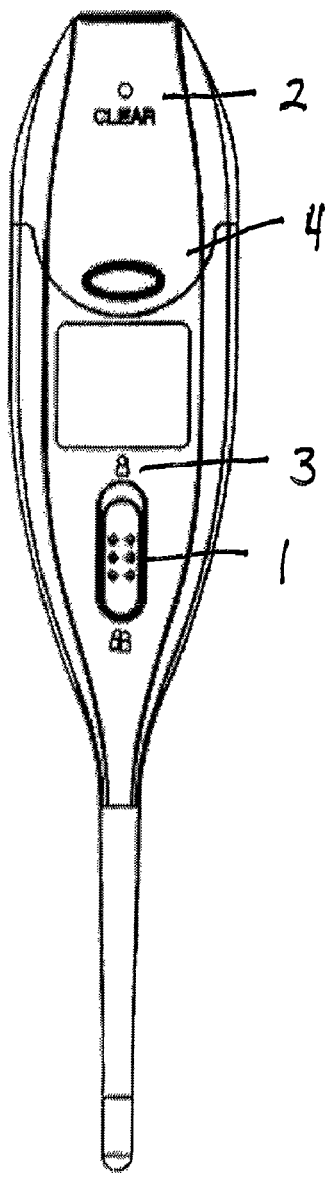
Fig. 4  Fig. 6b  Fig. 5
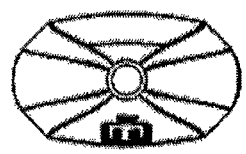
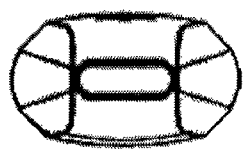
Fig. 6c  Fig. 6a

|  | Temp Value | Unit | User ID | Memory No. |
|---|---|---|---|---|
| Example 1 | 103.8 | °F | User 1 | Empty (New result) |
| Example 2 | 37.5 | °C | User 2 | 3 |

| Memory No. | New | M1 | M2 | ...... | M8 | M9 |
|---|---|---|---|---|---|---|
| Temp (°C) | 37.5 | 36.8 | 37.0 | | 36.9 | 37.2 |

Delete

| Memory No. | New | M1 | M2 | M3 | ...... | M9 |
|---|---|---|---|---|---|---|
| Temp (°C) | 37.4 | 37.5 | 36.8 | 37.0 | | 36.9 |

FIG. 9

INTELLIGENT ILLUMINATION THERMOMETER

FIELD OF THE INVENTION

The present invention relates to thermometers, and relates more particularly to a thermometer having two units of dual color LED and a program therein facilitating indication of change and level of temperature of each of multiple users.

BACKGROUND OF THE INVENTION

Digital and electronic thermometer is more and more popular nowadays as a mean for conveniently reading the temperature of a human being. It is now easily accessible by household family.

There are thermometers with signal indicators in the form of sound, digital display module and illumination. Among the digital thermometers, LCD is one of the convenient and economic signal means.

Various thermometers apparatus have been developed and appeared on the market. In most cases, users will conduct the temperature sensing till a beep sound or other sound signal is activated, indicating the completion of testing. Then, the users may read the temperature reading via the LCD. This method has a draw back of having to take reference of the meaning of the temperature reading before or afterwards. Otherwise, the users might not capture the full meaning of the new temperature reading.

In some improved thermometers, the users may also read the temperature reading via the LCD with illumination means such as LED in the dark.

SUMMARY OF THE INVENTION

It is an object of the present invention to provide a thermometer having a set of switches, enabling the users to control the change of Celsius display and Fahrenheit display and the change of user 1 and 2.

It is another object of the present invention to provide a thermometer having memory means facilitating the record and retrieval of the history of temperature readings of more than one user.

It is a further object of the present invention to provide a thermometer having a buzzer receiving instruction from the Controller IC and in response thereto to give out signal upon a temperature measurement is started, completed and completed with invalid result.

It is still a further object of the present invention to provide a thermometer facilitating the record and retrieval, and comparison of the temperature readings each of multiple users.

It is yet a further object of the present invention to provide a program allowing user to identify itself and comparing the new temperature reading 5 and the immediate preceding temperature reading of the same user.

It is still a further object of the present invention to provide two dual color LED units indicating the upward or downward or unchanged status of the new temperature reading against the immediate preceding temperature reading of the same user.

It is another object of the present invention to provide a flashing signal indicating the seriousness of the fever level when it exceeds a predetermined temperature limit.

The present invention is, in one form, a thermometer incorporates a buzzer that is controlled by a Controller IC. The Controller IC calculates temperature, drives the LCD and activates the buzzer when a new temperature reading is obtained after the user pressed the start push button. The buzzer goes off after the loop of reading temperature is undergoing and gives out another signal when a stable temperature is obtained, upon which the temperature reading is completed. The buzzer gives out another signal differing from the sounds indicating start and complete of the temperature reading when a temperature outside the range of predetermined temperature limits is obtained. In a preferred embodiment, the range is between 90.degree.Fahrenheit and 108.degree.Fahrenheit. Alternatively, the display module can also gives out different semantic references indicating the start, complete and invalid reading of the temperature reading.

In another embodiment of the present invention, the switch activates Controller IC selecting first or second memory units. Thereby, the user identifies itself as either first user or second user. The display unit also gives out signal allowing the user to ascertain the specified user ID and thus the appropriate memory unit is selected. The user may then retrieve its own history of temperature readings.

In yet another preferred form of the present invention, when a new temperature reading is obtained, the Controller IC calculates and compares it against the immediate preceding temperature reading of the same user. The Controller IC then activates the LED units giving out arrow shape signal showing the upward, downward or unchanged status of the temperature of the same user. When the temperature reading increases, the LED unit points up whilst, the temperature reading decrease, the LED unit points down.

In an alternate embodiment, the thermometer gives out different color through its display module indicating the status of non-fever and fever. The thermometer also gives out flashing signals through the LED units when it obtains a new temperature reading exceeds a predetermined level. In one form, the predetermined level is set at the level of 102.2.degree.Fahrenheit. The user is alerted by the flashing signals of its severe level of fever and the needs to get immediate medical attention and treatment.

In a fuller embodiment, the thermometer simultaneously gives out directional signal and colored signals showing the change and the level of the new temperature reading.

The present invention is carried out by an oral contact type thermometer. Alternatively, the present invention is carried out by a tympanic infrared type thermometer.

A preferred form of the thermometer, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 1 is the front view of the present invention in the form of a tympanic thermometer.

FIG. 2 is the back view of the tympanic thermometer illustrated in FIG. 1.

FIGS. 3*a*, 3*b*, 3*c* are a top view, side view and bottom view of the tympanic thermometer illustrated in FIG. 1.

FIG. 4 is the front view of the present invention in the form of an oral thermometer.

FIG. 5 is the back view of the oral thermometer illustrated in FIG. 4.

FIGS. 6*a*, 6*b*, 6*c* are a top view, side view and bottom view of the oral thermometer illustrated in FIG. 4.

FIG. 9 is two tables showing the memory storage sequence;

DETAILED DESCRIPTION OF THE PREFERRED EMBODIMENTS

Figure 7:
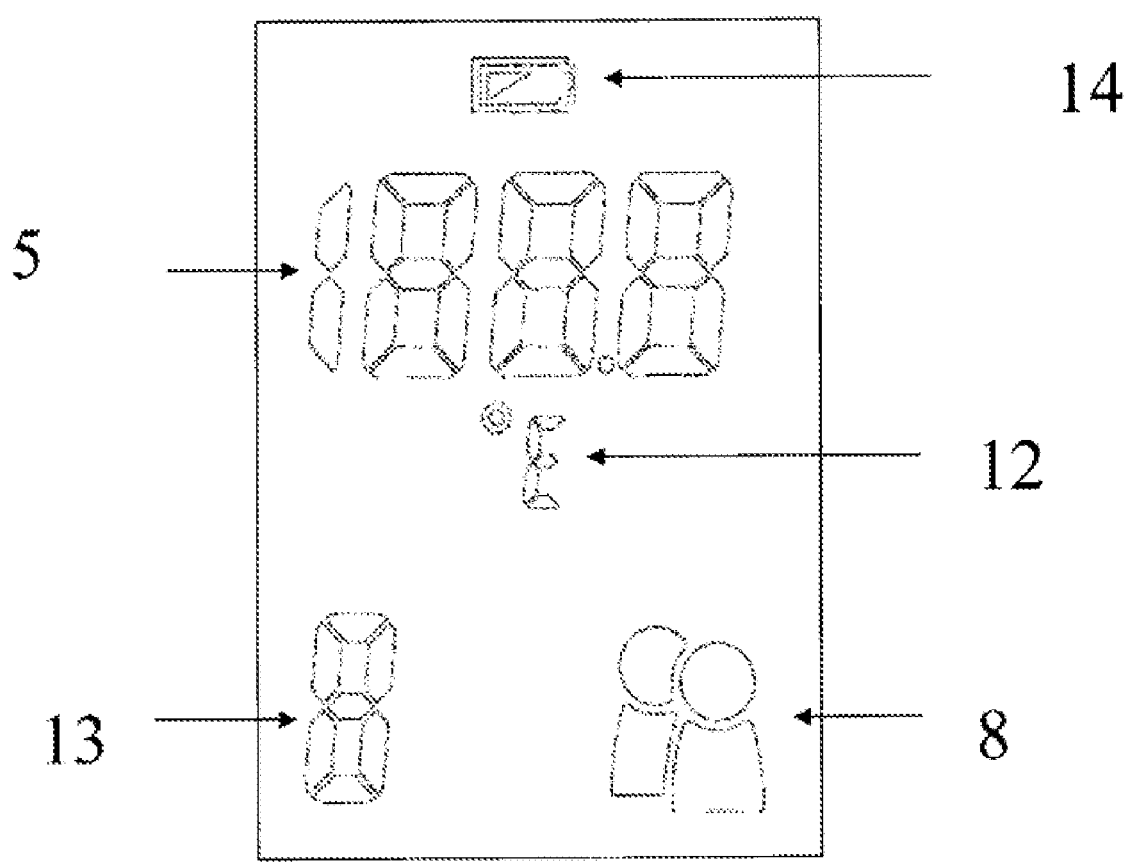
FIG. 7 is a display module of one embodiment of the present invention.

The following detailed description refers to the accompanying drawings. Wherever possible, the same reference numbers are used in the drawings and the following description to refer to the same or similar parts. While several exemplary embodiments and features of the present invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the present invention. Instead, the proper scope of the present invention is defined by the appended claims.

Initially referring to FIG. 1, a front view of an implementation of the present invention in the form of tympanic thermometer is illustrated. This thermometer includes a controller integrated circuit (Controller IC) that performs the required processing and input/output functions of the thermometer. Included within the Controller IC is a microprocessor and program, and all required interface connections. Further, in one embodiment, the thermometer housing is an elongated section which ends in a thermo-conductive tip and the thermometer houses a temperature sensing means 38. A liquid crystal display (LCD 11) is coupled to the Controller IC and provides a display of the temperature and other information received from Controller IC. The thermometer further includes a set of switches. In preferred embodiment, the set of switch includes start push button 10, memory retrieval button 9, clear memory button 3, user select button 1, Celsius/Fahrenheit display button 4, such buttons coupled to the Controller IC. It may be appreciated that further buttons adapted to accommodate more functions are envisaged. For example, it may add a delete memory button facilitating the removal of at least one recorded reading or at least one user identification record. Controller IC is responsive to the momentary press of the aforesaid buttons. A LED backlight means is further coupled to the Controller IC and provides the desired lighting to LCD 11 when activated by Controller IC. In a preferred embodiment, the backlight is activated for 5 seconds when any button is pressed 16 and upon the temperature measurement is completed. A buzzer coupled to the Controller IC provides audible signals in response to activation signal received from Controller IC. A battery, being covered by a battery cover 2, is coupled to the thermometer to provide power to the thermometer. The thermometer further includes a memory means coupled to the Controller IC.

Figure 11:
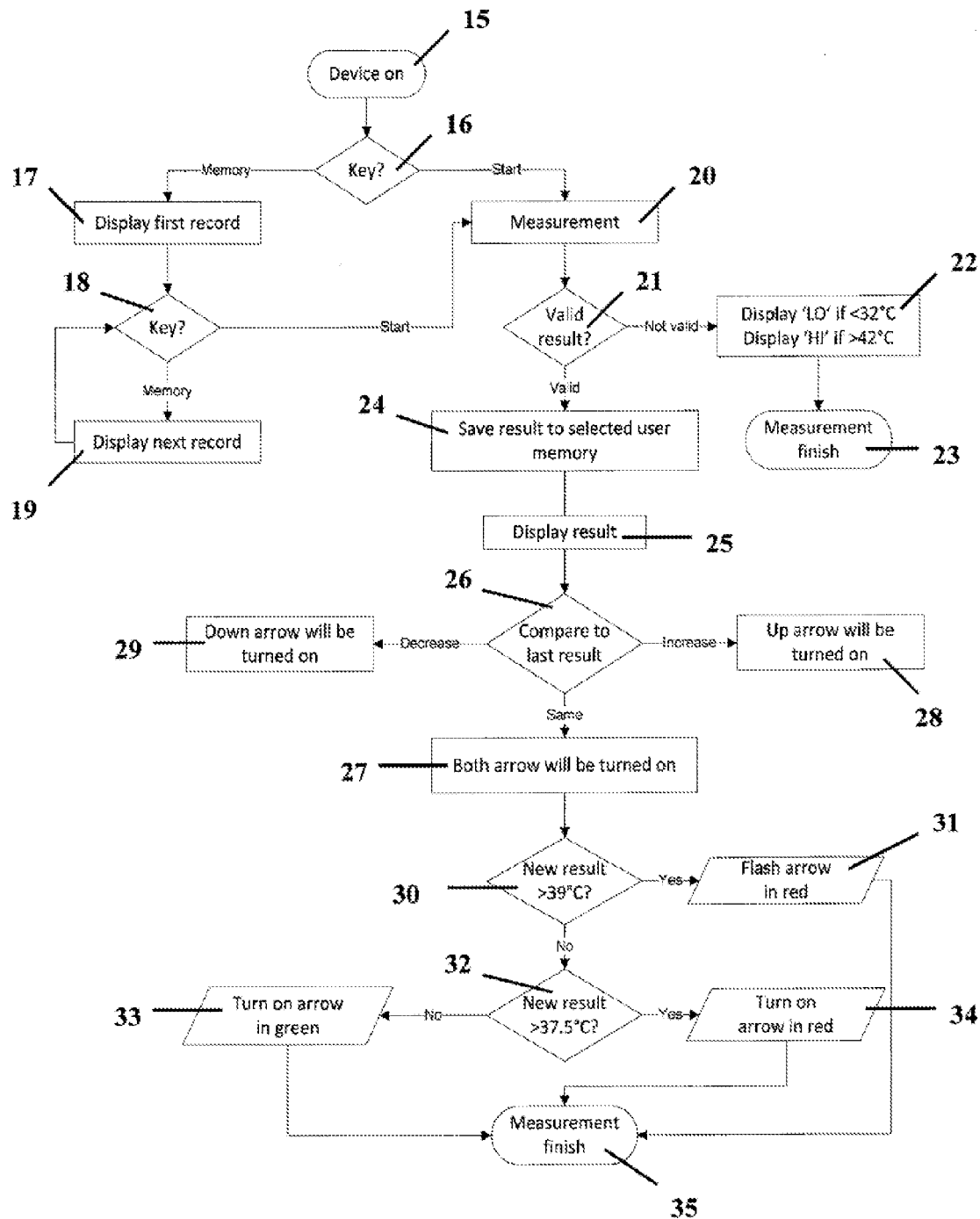
FIG. 11 is a flowchart of a program implementing the operation of the thermometer

The operation of the thermometer of the present invention is controlled by an algorithm programmed within IC. The flow chart of FIG. 11 illustrates an algorithm used in one embodiment of the present invention. Initially, the start push button 10 is pressed to initiate the temperature sensing means 20. The buzzer is simultaneously activated and delivers a beep sound. The start signal is preferably set for a duration of 0.5 second. It will be appreciated by those skilled in the art that the testing or sampling of the temperature runs repeatedly until a stable peak measurement is obtained. When the temperature remains constant for the predetermined time, the buzzer is then activated again to produce a beep sound, preferably for a duration differing and longer than the beep sound for the start measurement. This beep sound upon completion of temperature measurement also indicates a valid result is obtained. Preferably, this beep sound indicating the completion of temperature measurement is 1 second. For the situations of temperature reading after a predetermined time is not obtained or falling outside a predetermined range 22, preferably, below 32.degree.Celsius or above 42.degree.Celsius, the buzzer will give out signals indicating invalid measurement. Preferably, this beep sound indicating invalid measurement is different from the beep sounds of start and complete. In one embodiment, this beep sound indicating invalid measurement is the alternate plays of 0.5 second beep and 0.5 second silence for three times.

The stable peak temperature will be stored 24 in the memory means 36 and displayed on LCD 11. The memory means keep saved 24 records of stable peak temperature and the program activates the display of saved record in sequence 19 when the memory retrieval button 9 is pressed 18. The IC will clear the memory when clear memory button 3 is pressed. The algorithm proceeds by determining which one of the Celsius or Fahrenheit display mode is selected. The program then activates the display in terms of the selected temperature display mode 12. In a preferred embodiment, the temperature display mode is displayed interchangeably in that, when the Celsius/Fahrenheit display button 4 is pressed, representing the other mode of temperature display is selected, the other mode of temperature 12 will be calculated and displayed accordingly.

Figure 12:
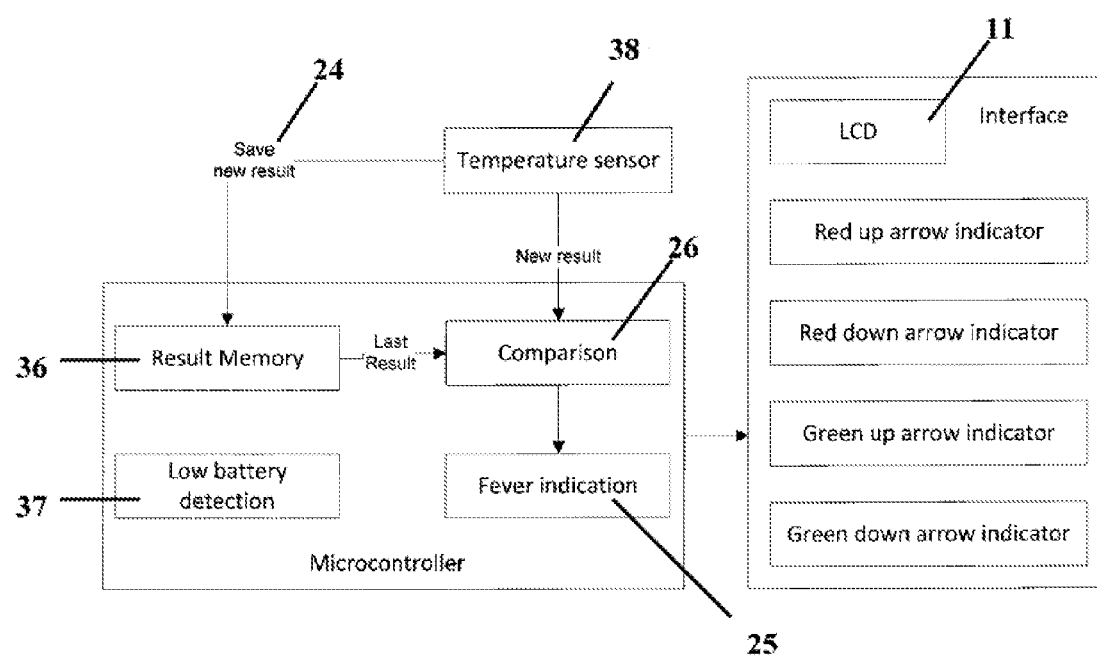
FIG. 12 is a block diagram of aspects of the thermometer.

At the time of displaying the new temperature reading 5 via LCD 11, the IC retrieves the immediate preceding temperature reading of the same user stored in the memory means, and compares 26 it against the new temperature reading 5. FIG. 12 is a flow chart illustrating the processing and display module with the addition of arrow indicator. When the new temperature is above the immediate preceding temperature reading, an arrow indicator pointing upwards 6 will be activated 28. When the new temperature is below the immediate preceding temperature reading, an arrow indicator pointing downwards will be activated 29. When the new temperature reading 5 is the same as the immediate preceding reading, both arrows will be turned on 27. Alternatively, neither arrows will be turned on indicating no change of temperature reading. In alternative embodiment, the arrow indicators may be replaced by color indicators, combined in one LCD 11 screen display or accompanied by LCD 11 showing the semantic reference of the change status of the temperature reading. Further, when IC detects low battery 37, the IC activates the low battery signal 14 alerting user to replace new battery. Upon detection of no operation of the thermometer for a predetermined time duration, preferably 1 minute, the IC shuts down the power automatically to save power.

In a preferred embodiment of the present invention provides for color indication mode put on the arrow indicator being automatically initiated when a comparison of the new temperature reading 5 and a predetermined level of temperature reading is conducted. When the temperature reading 5 is above 37.5.degree.Celsius or 99.5.degree.Fahrenheit equivalent 32, indicating a fever in the user, the arrow indicator is illuminated in a distinct color. In preferred embodiment, this distinct color is red. When the temperature reading 5 is same or below 37.5.degree.Celsius or 99.5.degree.Fahrenheit equivalent, the arrow indicator is illuminated in another color. In preferred embodiment, this color is green indicating the safe level of temperature reading. In this embodiment, the IC performs an additional test to determine whether the temperature has exceeded a predetermined threshold value. In a preferred embodiment, when the temperature reading 5 is above 39.degree.Celsius or 102.2.degree.Fahrenheit equivalent 30, the color mode is red and the arrow indicator will be flashing 31 indicating the high level of temperature reading 5 and the immediate need of medical attention and treatment. In alternative embodiment, the colored arrow indicator and the LCD 11 could be delivered in one screen.

Figure 8:
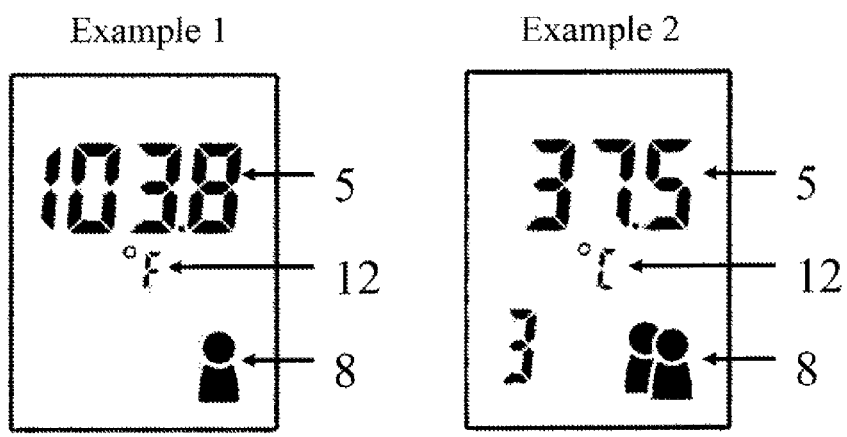
FIG. 8 is an example illustrating the two display modules showing 2 users temperature history records respectively.

In one embodiment of the present invention, the thermometer allows multiple users to identify themselves; and for illustration purpose, it is described herein the thermometer allows the identification of a number of two users and the IC stores temperature readings of each user individually in its designated memory unit. Upon the user select button 1 is pressed, the IC will retrieve the past records of the other user and send electronic signal to the corresponding memory unit of such user upon a new temperature is read. In the preferred embodiment, the user select button 1 is a slide switch. A user may retrieve up to nine records of past records of temperature readings 13. FIG. 8 illustrates the LCD 11 of the stored temperature readings of user 1 and user 2 respectively. FIG. 9 illustrates the algorithm of the memory storage sequence. When a new temperature reading 5 is obtained, it will be stored as M1 and each past record will be put forward to the next number assigned in sequence. The existing M9 will be deleted. This invention also is enhanced without compromise by other features such as larger number of memory units and memory records.

Figures 10A, 10B, 10C:
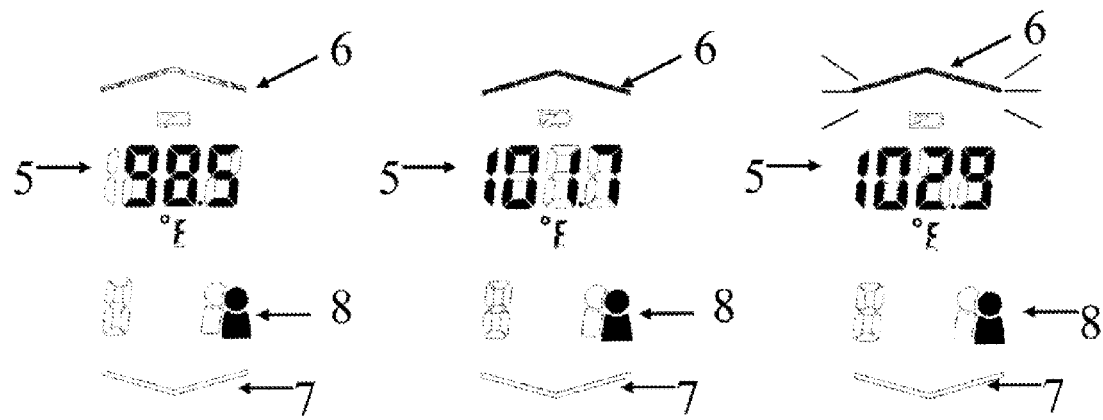
FIGS. 10a, 10b, 10c, 10d, 10e, 10f are the display modules implementing operation of new temperature reading and its comparison against the immediate preceding reading.

FIG. 10*a* illustrates an example that the user 1's new temperature reading 5 is 98.5.degree.Fahrenheit. Assuming its immediate preceding temperature reading is lower, then the green up arrow 6 is turned on 33, indicating no fever and upward change of temperature reading.

FIG. 10*b* illustrates another example that the user 1's new temperature reading 5 is 101.7.degree.Fahrenheit. Assuming its immediate preceding temperature reading is lower, then the red up arrow 6 is turned on 34, indicating fever and upward change of temperature reading.

FIG. 10*c* illustrates an example that the user 1's new temperature reading 5 is 102.9.degree.Fahrenheit. Assuming its immediate preceding temperature reading is lower, then the red up arrow 6 is turned on and flashing 31, indicating serious fever and upward change of temperature reading.

Figures 10D, 10E, 10F:
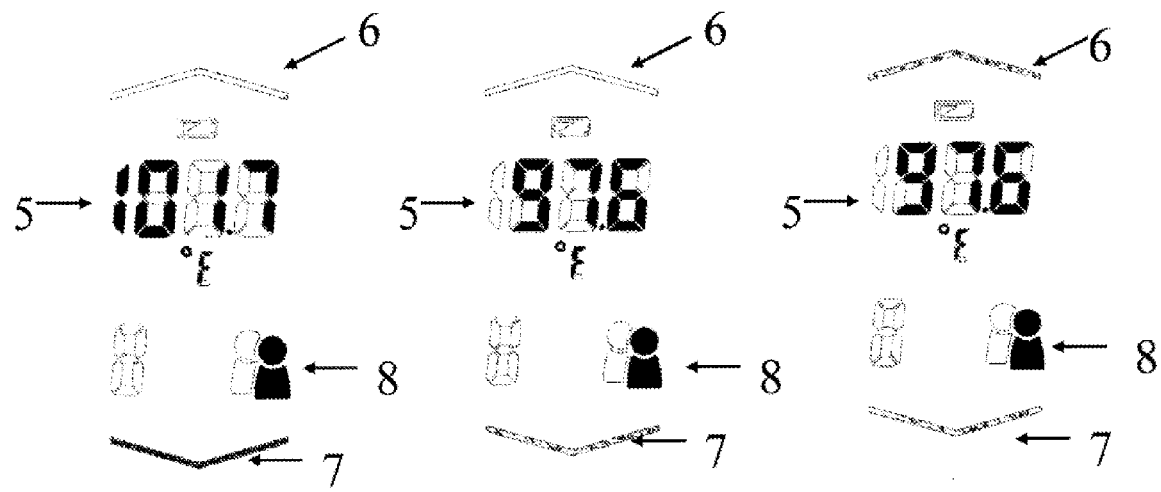

FIG. 10*d* illustrates an example that the user 1's new temperature reading 5 is 101.7.degree.Fahrenheit. Assuming its immediate preceding temperature reading is higher, then the red down arrow 7 is turned on 34, indicating fever and downward change of temperature reading.

FIG. 10*e* illustrates an example that the user 1's new temperature reading 5 is 97.6.degree.Fahrenheit. Assuming its immediate preceding temperature reading is higher, then the green down arrow 7 is turned on 33, indicating no fever and downward change of temperature reading.

FIG. 10*f* illustrates an example that the user 1's new temperature reading 5 is 97.6.degree.Fahrenheit. Assuming its immediate preceding temperature reading is the same, then the green up and down arrows are turned on 27, indicating no fever and no change of temperature reading.

It will be appreciated by those skilled in the art that the thermometer of the present invention will allow implementation of the same features, equally suitable for use in the oral thermometer illustrated in FIG. 4, FIG. 5, FIGS. 6*a, b* and *c*.

While certain features and embodiments of the present invention have been described, other embodiments of the present invention will be apparent to those skilled in the art from consideration of the specification and practice of the embodiments of the invention disclosed herein. It is intended, therefore, that the specification and examples be considered as exemplary only, and should not be considered restrictive of the scope of the invention, as described and claimed, with a true scope and spirit of the present invention being indicated by the claims and their full scope of equivalents. Further, features and/or variations may be provided in addition to those set forth herein. For example, embodiments of the present invention may be directed to various combinations and sub-combinations of the features described in the detailed description.

The invention claimed is:

1. A thermometer for measuring a temperature of a user comprising:

a controller integrated circuit having a program therein suitable for establishing and controlling functions of the thermometer, one of the functions being a detection of when a new temperature measurement is started, completed and uncompleted when an invalid temperature is read outside of a predetermined range;

a temperature sensing means operatively connected to said controller integrated circuit, said temperature sensing means for providing an electrical signal to said controller integrated circuit which corresponds to a temperature proximate to said temperature sensing means;

a liquid crystal display being operatively coupled to said controller integrated circuit so as to receive electrical signals from said controller integrated circuit relative to a sensed temperature from said temperature sensing means and to convert said electrical signals into an optical display, said liquid crystal display receiving electrical signals from said controller integrated circuit so as to display a specific user identification of the user;

an LED backlighting means operatively coupled to said controller integrated circuit and operatively coupled to said liquid crystal display;

a plurality of switches operatively coupled to said controller integrated circuit, said plurality of switches communicating instructions from the use of the thermometer to said controller integrated circuit so as to provide user direction to said program within said controller integrated circuit, said LED backlighting means for receiving an activation signal from said controller integrated circuit so as to activate said LED backlighting means upon a detection of at least one of said plurality of switches being processed and a completed temperature measurement;

a powering means operatively coupled to said controller integrated circuit, said powering means for controlling a power off or a power on of the thermometer;

a memory means being operatively coupled to said controller integrated circuit, said memory means for receiving electrical signals from said controller integrated circuit related to a sensed temperature from said temperature sensing means and for recording the sensed temperature; and a buzzer signaling means being operatively coupled to said controller integrated circuit, said buzzer signaling means for receiving at least one activation signal from the controller integrated circuit, said program suitable for activating said buzzer signaling means upon a detection that the temperature measurement is started, completed and uncompleted with the invalid temperature reading outside a predetermined range, said LED backlighting means comprising a pair of dual color LED units suitable for receiving activation signals from said controller integrated circuit, a first LED unit of said pair of dual color LED units being responsive to a first activation signal, second LED unit of said pair of dual color LED units responsive to a second activation signal, said controller integrated circuit selecting said first LED unit when a new temperature reading is higher than an intermediate preceding temperature reading of the user, said controller integrated circuit selecting said second LED unit when the new temperature reading is lower than the intermediate preceding temperature reading of the user, said controller integrated circuit selecting said first LED unit and said second LED unit when the new temperature reading is the same as the intermediate preceding temperature reading of the user.

2. The thermometer of claim 1, said pair of dual color LED units are each of an arrow shape and point in different directions, said first LED unit being positioned above said second LED unit.

3. The thermometer of claim 1, said memory means comprising a first memory unit and a second memory unit, said first memory unit receiving and recording electrical signals from said controller integrated circuit related to a temperature of a first user as sensed by said temperature sensing means, said second memory unit receiving and recording electrical signals from said controller integrated circuit related to a temperature of a second user as sensed by said temperature sensing means, said controller integrated circuit selecting said first memory unit when said controller integrated circuit receives an instruction signal from one of said plurality of switches identifying the first user, said controller integrated circuit selecting said second memory unit when said controller integrated circuit receives an instruction signal from another of said plurality of switches identifying the second user.

4. The thermometer of claim 3, said program of said controller integrated circuit suitable for sending electrical signals to one of said first and second memory units so as to record the new temperature reading of the user and to compare the new temperature reading with the intermediate temperature reading of the same user.

5. The thermometer of claim 1, said controller integrated circuit selecting said first LED unit when the new temperature reading is above 99.5° F., said controller integrated circuit selecting and second LED unit when the new temperature reading is at or below 99.5° F.

6. The thermometer of claim 5, said first LED unit being of an arrow shape and pointing upwardly, said first LED unit illuminating and of a first color in response to the new temperature reading of above 99.5° F. and below 102.2° F., said first LED illuminating and of a second color in response to the new temperature reading of at or below 99.5° F., said second LED unit being of an arrow shape and pointing downwardly, said second LED unit illuminating and of a first color in response to the new temperature of above 99.5° F., said second LED unit illuminating and of a second color in response to the new temperature of at or below 99.5° F.

7. The thermometer of claim 6, said first color of said first LED unit being red, said second color of said first LED unit being green.

8. A thermometer for measuring a temperature of a user comprising:
a controller integrated circuit having a program therein suitable for establishing and controlling functions of thermometer;
a temperature sensing means being operatively connected to the controller integrated circuit, said temperature sensing means for providing an electrical signal to the controller integrated circuit which corresponds to a temperature proximate to said temperature sensing means;
a liquid crystal display being operatively coupled to said controller integrated circuit, said liquid crystal display suitable for receiving signals from said controller integrated circuit so as to display an identification of a specified user and suitable for further receiving electrical signals from the controller integrated circuit related to a sensed temperature from said temperature sensing means and a compared result of a new temperature reading and immediate preceding temperature reading of the same user and suitable for converting the electrical signals into an optical display;
an LED backlighting means being operatively coupled to said controller integrated circuit and operatively coupled to said liquid crystal display, said LED backlighting means being of an arrow shape having a pointing direction, said LED backlighting means receiving an activation signal from said controller integrated circuit, said program of said controller integrated circuit suitable for activating said LED backlighting means so as to provide an indication of a change and a level of temperature;
a plurality of switches operatively coupled to said controller integrated circuit, said plurality of switches communicating instructions from the use of the thermometer to said controller integrated circuit so as to provide user direction to said program within said controller integrated circuit;
a power means being operatively coupled to said controller integrated circuit, said power means for controlling a power off or a power on of the thermometer;
a memory means being operatively coupled to said controller integrated circuit, said memory means for receiving electrical signals from said controller integrated circuit related to a sensed temperature from said temperature sensing means and for recording the electrical signals, said memory means comprising a first memory unit and a second memory unit relating to the sensed temperature of a first user and of a second user, respectively;
a buzzer signaling means being operatively coupled to said controller integrated circuit, said buzzer signaling means receiving at least one activation signal from said controller integrated circuit, said program of said controller integrated circuit activating said buzzer signaling means upon a detection that the temperature measurement is started, completed and uncompleted with the invalid temperature reading outside a predetermined range, said program sending electrical signals to one of said first memory unit and said second memory unit so as to record the new temperature reading of the user and comparing the new temperature reading against the intermediate temperature reading of the user.

* * * * *